(12) United States Patent
Namura et al.

(10) Patent No.: US 8,079,636 B2
(45) Date of Patent: Dec. 20, 2011

(54) CAB FOR CONSTRUCTION MACHINE

(75) Inventors: Akihide Namura, Hirakata (JP);
Takahiro Noguchi, Yawata (JP);
Hiroaki Tanaka, Hirakata (JP); Fumiaki Kawahara, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 12/991,462

(22) PCT Filed: Jun. 26, 2009

(86) PCT No.: PCT/JP2009/061763
§ 371 (c)(1),
(2), (4) Date: Nov. 8, 2010

(87) PCT Pub. No.: WO2010/007870
PCT Pub. Date: Jan. 21, 2010

(65) Prior Publication Data
US 2011/0057479 A1 Mar. 10, 2011

(30) Foreign Application Priority Data

Jul. 16, 2008 (JP) .................................. 2008-185367
Feb. 24, 2009 (JP) .................................. 2009-041128

(51) Int. Cl.
*B60K 7/00* (2006.01)
(52) U.S. Cl. ................................................. 296/190.08
(58) Field of Classification Search ............. 296/190.08, 296/190.11, 187.13, 190.01, 190.03, 205, 296/193.06, 203.04, 210; 180/89.12; 29/428, 29/505, 897.2
See application file for complete search history.

(56) References Cited

U.S. PATENT DOCUMENTS

| 4,978,163 | A | * | 12/1990 | Savio | 296/190.08 |
| 6,123,378 | A | * | 9/2000 | Teply et al. | 296/29 |
| 6,149,228 | A | * | 11/2000 | O'Neill et al. | 296/190.03 |
| 6,409,254 | B2 | * | 6/2002 | Tiziano | 296/190.08 |
| 6,568,746 | B2 | | 5/2003 | Sakyo et al. | |
| 6,582,010 | B2 | * | 6/2003 | Sakyo et al. | 296/190.08 |
| 6,752,228 | B2 | * | 6/2004 | Aoyama et al. | 180/89.12 |
| 6,948,768 | B2 | * | 9/2005 | Corcoran et al. | 296/190.08 |

(Continued)

FOREIGN PATENT DOCUMENTS

JP 3-99070 U 10/1991
(Continued)

OTHER PUBLICATIONS

International Search Report of corresponding PCT Application No. PCT/JP2009/061763.

*Primary Examiner* — Kiran B. Patel
(74) *Attorney, Agent, or Firm* — Global IP Counselors

(57) ABSTRACT

A cab for a construction machine includes a pillar member and a beam member. The pillar member is disposed generally along a vertical direction, and includes a cutout portion and a protruding portion. The cutout portion is formed on an upper end thereof. The protruding portion is formed on the upper end on an inner side of the cutout portion with respect to a widthwise direction of the cab. The beam member is disposed generally along a direction perpendicular to the vertical direction. The beam member is joined to the pillar member with the beam member partially overlapping the cutout portion on the upper end of the pillar member in a plan view, and a lateral surface of the beam member abutting against the protruding portion.

9 Claims, 13 Drawing Sheets

U.S. PATENT DOCUMENTS

| | | | |
|---|---|---|---|
| 7,290,829 B2 * | 11/2007 | Umemoto et al. | 296/190.08 |
| 7,581,783 B2 * | 9/2009 | Mori et al. | 296/190.08 |
| 7,695,055 B2 * | 4/2010 | Tsukamoto | 296/190.11 |
| 7,712,818 B2 * | 5/2010 | Yano et al. | 296/146.16 |
| 7,770,963 B2 * | 8/2010 | Tsukamoto et al. | 296/190.08 |
| 7,798,292 B2 * | 9/2010 | Nunez | 188/16 |
| 7,871,123 B2 * | 1/2011 | Stojkovic et al. | 296/193.09 |
| 7,887,124 B2 * | 2/2011 | Tsukamoto | 296/190.08 |
| 2009/0115223 A1 | 5/2009 | Tsukamoto | |
| 2010/0032985 A1 * | 2/2010 | Yamamoto et al. | 296/190.08 |
| 2010/0164251 A1 * | 7/2010 | Itou | 296/205 |
| 2010/0314908 A1 * | 12/2010 | Wood et al. | 296/190.03 |

FOREIGN PATENT DOCUMENTS

| | | |
|---|---|---|
| JP | 2002-161552 A | 6/2002 |
| JP | 2006-321372 A | 11/2006 |
| WO | WO-2006/123475 A1 | 11/2006 |
| WO | WO-2007/010808 A1 | 1/2007 |

\* cited by examiner (a)

(b)

(a)

(b)

CAB FOR CONSTRUCTION MACHINE

CROSS-REFERENCE TO RELATED APPLICATIONS

This national phase application claims priority to Japanese Patent Application No. 2008-185367 filed on Jul. 16, 2008, and Japanese Patent Application No. 2009-041128 filed on Feb. 24, 2009. The entire disclosures of Japanese Patent Application Nos. 2008-185367 and 2009-041128 are hereby incorporated herein by reference.

TECHNICAL FIELD

The present invention relates to a cab mounted on a construction machine such as a hydraulic excavator.

BACKGROUND ART

Cabs mounted on construction machines adopt cab structures formed by pipe materials having hollow in the inside thereof as pillar members.

In the structures of the cabs mounted on the construction machines, the pipe materials used as the pillar members are required to have strength greater than or equal to a predetermined value. When thicknesses of the pipe materials are increased for enhancing strength of the pipe materials, however, this will be a factor of increasing cost such as material cost and processing cost. In response, a reinforcing structure has been demanded for solving both of the drawbacks in strength and cost.

For example, Japan Laid-Open Patent Application Publication No. 2006-321372 describes a cab having a structure that a coupling member is disposed at a joint section between a pillar member and a beam member for joining the pillar member and the beam member through the coupling member.

SUMMARY

However, the above conventional cab for the construction machine has the following problem.

The cab for the construction machine, described in the aforementioned patent literature, is required to dispose the coupling member at the joint section between the pillar member and the beam member for assisting joint therebetween. This results in increase in the number of components forming the cab.

It is an object of the present invention to produce a cab for a construction machine for avoiding increase in the number of components due to addition of members such as a coupling member and simultaneously for rigidly joining the pillar member and the beam member.

A cab for a construction machine according to a first aspect of the present invention includes a pillar member and a beam member. The pillar member is disposed generally along a vertical direction. The pillar member includes a cutout portion and a protruding portion. The cutout portion is formed on an upper end of the pillar member. The protruding portion is formed on the upper end on an inner side of the cutout portion with respect to a widthwise direction of the cab. The beam member is generally disposed along a direction perpendicular to the roughly vertical direction. The beam member is joined to the pillar member with the beam member partially overlapping the cutout portion on the upper end of the pillar member in a plan view and a lateral surface of the beam member abutting against the protruding portion.

In the cab of the first aspect of the present invention, for instance, the following joint structure is adopted for the joint section between the pillar member and the beam member, both of which form a part of the cab for the construction machine (e.g., the hydraulic excavator).

The cutout portion and the protruding portion are herein formed on the upper end of the pillar member. The cutout portion is formed by partially cutting out the upper end, whereas the protruding portion is reliably formed on the upper end after the upper end is partially cut out. A cab is formed by the aforementioned pillar member and the beam member extended to the upper end of the pillar member in a plan view. Specifically, the pillar member and the bean member are joined to each other under the condition that the beam member is partially disposed on the cutout portion formed on the upper end of the pillar member and a lateral surface of the beam member is abutted to the protruding portion formed on the upper end of the pillar member. Further, the protruding portion is formed on a part of the upper end of the pillar member while facing the operator's room of the cab.

The protruding portion, formed on the upper end of the pillar member, herein refers to a portion reliably formed after the cutout portion is formed on the upper end of the pillar member. For example, the protruding portion refers to a part of the upper end of the pillar member, which faces the operator's room of the cab. It should be noted that arrangement of the protruding portion and the cutout portion formed in the pillar member is not particularly limited. On the other hand, any suitable processing (e.g., forming a cutout) may be executed for the portion of the beam member to be joined to the upper end of the pillar member. Alternatively, no special processing may be executed for the portion of the beam member. Further, the protruding portion may be extended along a roughly vertical direction on the upper end of the pillar member disposed along a roughly vertical direction. The protruding portion may completely or partially occupy a part of the upper end of the pillar member, which faces the operator's room of the cab in a plan view. Yet further, the protruding portion and the beam member may be directly abutted to each other or indirectly abutted to each other through another member.

The pillar member and the beam member can be thereby rigidly joined to each other while the joint section therebetween ensures sufficient length by forming joint between the pillar member and the beam member under the condition that the beam member is disposed on a part of the cutout portion formed on the upper end of the pillar member and a lateral surface of the beam member is abutted to the protruding portion. Consequently, the pillar member and the beam member can be rigidly joined to each other with a simple structure without using other components such as a well-known coupling member.

Further, the protruding portion can support the beam member, for instance, even when large load is applied to the beam member from e.g., a lateral side of the cab in an accident of the construction machine (e.g., a rollover accident).

The cab for a construction machine according to a second aspect of the present invention relates to the cab for a construction machine according to the first aspect of the present invention. The cab further includes a transverse bar member abutting against a lateral surface of the inner side of the cab.

The cab for a construction machine according to a third aspect of the present invention relates to the cab for a construction machine according to the first or second aspect of the present invention. The cab further includes an additional pillar member disposed generally along the vertical direction on an opposite side from the pillar member with respect to the widthwise direction of the cab, or an additional beam member disposed generally along the direction perpendicular to the vertical direction on an opposite side from the beam member with respect to the widthwise direction. The cab further includes a transverse bar member. The transverse member connects at least one of between the pillar member and the additional pillar member and between the beam member and the additional beam member. The transverse bar member abuts against a joint section between the pillar member and the beam member and a joint section between the additional pillar member and the additional beam member from the inner side of the cab.

In the cab of the third aspect of the present invention, the transverse bar member connects the right-left pair of the pillar members or the right-left pair of the beam members at the joint sections, i.e., the joint section between the right pillar member and the right beam member and the joint section between the left pillar member and the left beam member. The transverse bar member is herein used as a reinforcing material for the joint sections between the pillar members and the beam members.

The aforementioned transverse bar member is herein interposed between the right-left pair of the pillar members or the right-left pair of the beam members while being disposed along a direction perpendicular to both of the pillar members and the beam members. It should be noted that the operator's room, from which the transverse bar member is abutted to the joint section, refers to an operator's room formed within the cab.

Accordingly, the transverse bar member can support the joint sections between the pillar members and the beam members even when large load is laterally applied to the cab. As a result, it is possible to produce a cab with enhanced stiffness against a shock from e.g., a lateral side without increasing the number of components.

The cab for a construction machine according to a fourth aspect of the present invention relates to the cab for a construction machine according to the first or second aspect of the present invention. In the cab, the pillar member and the beam member form a flat surface at a part of a joint section therebetween facing an outer side of the cab.

In the cab of the fourth aspect of the present invention, for instance, a part of the joint section between the pillar member and the beam member, which faces the outdoor space opposite to the cab space, is formed as a step-free flat surface for forming a glass attachment surface and the like. In other words, the surface of the joint section between the pillar member and the beam member, which faces the outdoor space, is continuously formed for preventing a step from being formed.

For example, it is thereby possible to form the glass attachment surface of the cab on the flat joint section between the pillar member and the beam member.

The cab for a construction machine according to a fifth aspect of the present invention relates to the cab for a construction machine according to the first or second aspect of the present invention. In the cab, the pillar member is a left rear pillar member disposed on a left rear part of the cab, and the beam member is joined to the left rear pillar member.

The cab for a construction machine according to a sixth aspect of the present invention relates to the cab for a construction machine according to the first or second aspect of the present invention. In the cab, each of the pillar member and the beam member is formed by a pipe material.

In the cab of the sixth aspect of the present invention, each of the pillar member and the beam member, forming a part of the cab, is formed by a pipe material having a hollow cross-section.

Therefore, weight of the entire cab can be reduced and stiffness of the cab can be enhanced with a simple structure.

The cab for a construction machine according to a seventh aspect of the present invention relates to the cab for a construction machine according to the sixth aspect of the present invention. The cab further includes a cover member inserted into a hollow of the pipe material at the upper end of the pillar member.

In the cab of the seventh aspect of the present invention, the cover member is inserted into the hollow at the upper end of the pillar member made of the pipe material.

A plate member is herein allowed to be used as the cover member. The plate member is formed to be matched with the shape of the inner peripheral surface of the pillar member made of the pipe material.

The cover member can be thereby used as a reinforcing member for holding the cross-section of the pillar member made of the pipe material. Consequently, it is possible to effectively enhance strength of the joint section between the beam member and the upper end of the pillar member with a simple structure.

The cab for a construction machine according to an eighth aspect of the present invention relates to the cab for a construction machine according to the seventh aspect of the present invention. In the cab, the cover member abuts against the lateral surface of the beam member together with the protruding portion.

The cab for a construction machine according to a ninth aspect of the present invention relates to the cab for a construction machine according to the seventh or eighth aspect of the present invention. In the cab, the cover member includes a bent portion joined to an end opening of the beam member disposed on the upper end of the pillar member.

In the cab of the ninth aspect of the present invention, the cover member, configured to be inserted into the end opening of the upper end of the pillar member, is partially bent for forming the bent portion configured to be joined to the end opening of the beam member.

With use of the cover member, cross-sectional strength of the beam member can be at least partially enhanced as well as the cross-sectional strength of the pillar member. Therefore, it is possible to enhance stiffness at the joint section between the pillar member and the beam member with a simple structure.

BRIEF DESCRIPTION OF DRAWINGS

FIG. 7 is composed of: FIG. 7(*a*) illustrating the entire structure of a left front pillar member forming a part of the cab illustrated in figures including FIG. 2; and FIG. 7(*b*) illustrating a cross-section of the left front pillar member observed along a Y direction.

FIG. 8 is composed of: FIG. 8(a) illustrating a side view of the entire structure of a left rear pillar member forming a part of the cab illustrated in figures including FIG. 2; and FIG. 8(b) illustrating a plan view of the left rear pillar member.

FIG. 9 is composed of: FIG. 9(a) illustrating an enlarged view of the structure of the upper end of right (left) rear pillar member illustrated in figures including FIG. 8(a); and FIG. 8(b) illustrating a side view of the upper end of the right (left) rear pillar member.

DESCRIPTION OF EMBODIMENTS

A cab 10 of a hydraulic excavator (a construction machine) 1 according to an exemplary embodiment of the present invention will be hereinafter explained with reference to FIGS. 1 to 12.

Structure of Hydraulic Excavator 1

Figure 1:
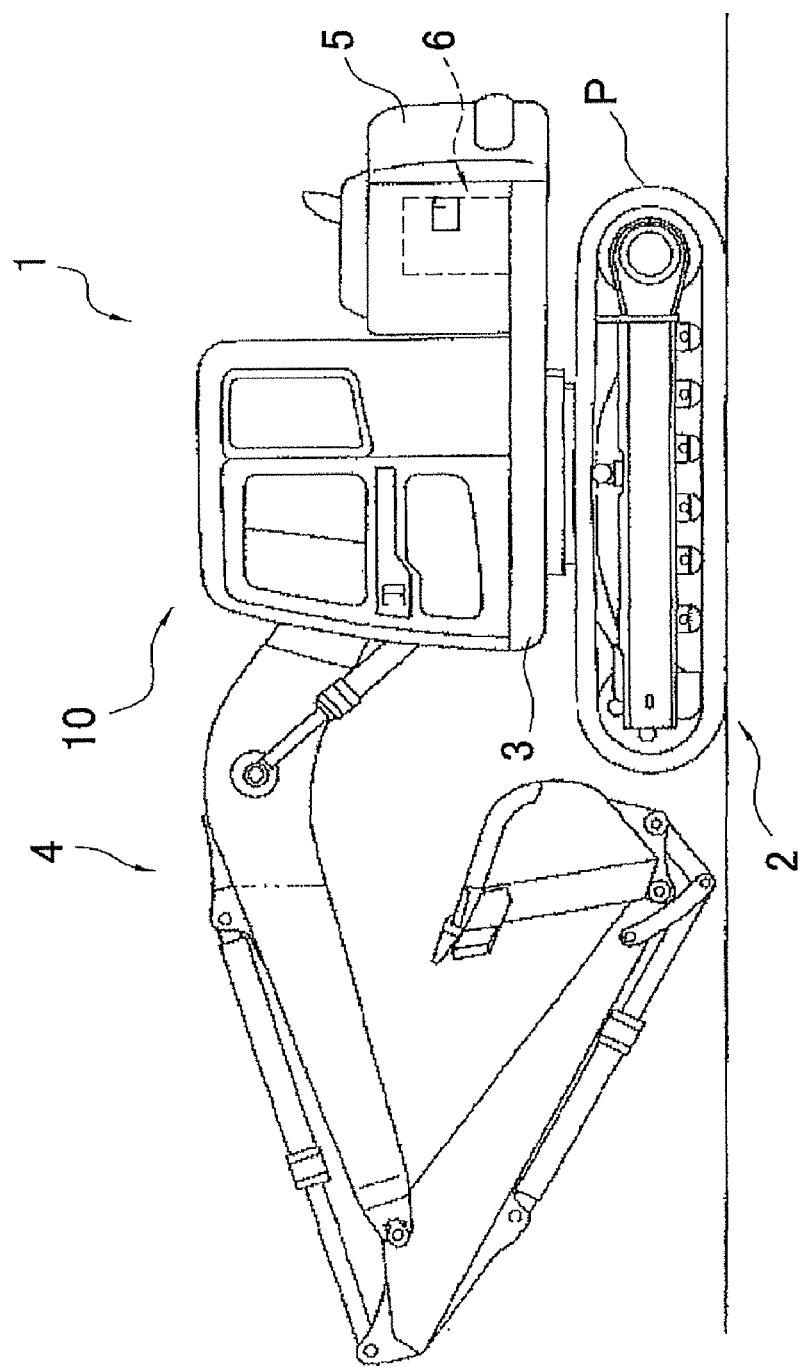
FIG. 1 is a side view of the entire structure of a hydraulic excavator according to an exemplary embodiment of the present invention.

As illustrated in FIG. 1, the hydraulic excavator 1 according to the present exemplary embodiment includes a lower traveling unit 2, a revolving unit 3, a working unit 4, a counterweight 5, an engine 6, and the cab 10.

The lower traveling unit 2 is configured to circulate a pair of crawler belts P wrapped around transverse end portions thereof disposed perpendicular to a travel direction for moving the hydraulic excavator 1 back and forth. The traveling unit 2 is provided with the revolving unit 3 on the top side thereof while allowing the revolving unit 3 to revolve thereon.

The revolving unit 3 is allowed to revolve on the lower traveling unit 2 in arbitral directions. The revolving unit 3 is provided with the working unit 4, the counterweight 5, the engine 6, and the cab 10 on the top side thereof.

The working unit 4 includes a boom, an arm attached to a distal end of the boom, and a bucket attached to a distal end of the arm. The working unit 4 is configured to move components such as the arm and the bucket up and down by means of a hydraulic cylinder for executing e.g., earth-sand excavation and sand-gravel excavation in earthmoving construction sites.

For example, the counterweight 5 is formed by solidifying materials (e.g., iron scraps and concrete) put in a box formed by assembling steel plates. The counterweight 5 is disposed behind the revolving unit 3 for balancing the vehicle body of the hydraulic excavator 1 in executing excavation and the like.

The engine 6 is a drive source for driving the lower traveling unit 2 and the working unit 4. The engine 6 is disposed adjacent to the counterweight 5.

The cab 10 is an operating room where an operator of the hydraulic excavator 1 gets on and off. The cab 10 is disposed on a left front part on the revolving unit 3 while being transversely adjacent to an attachment part for the working unit 4. The operator is thereby allowed to see the distal end of the working unit 4. It should be noted that the structure of the cab 10 will be hereinafter described in detail.

Structure of Cab 10

Figure 2:
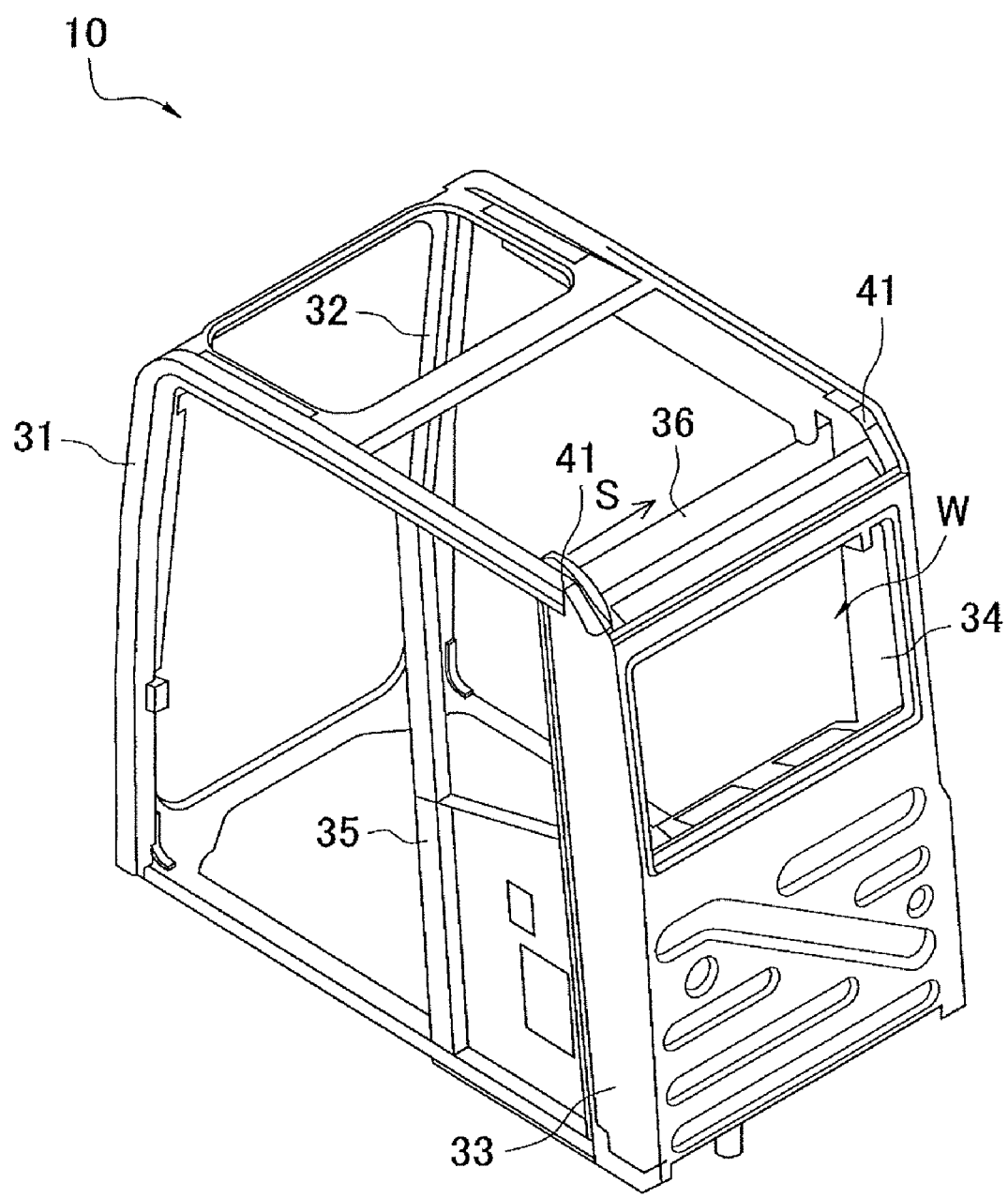
FIG. 2 is a perspective view of the structure of a cab mounted on the hydraulic excavator illustrated in FIG. 1.
Figure 3:
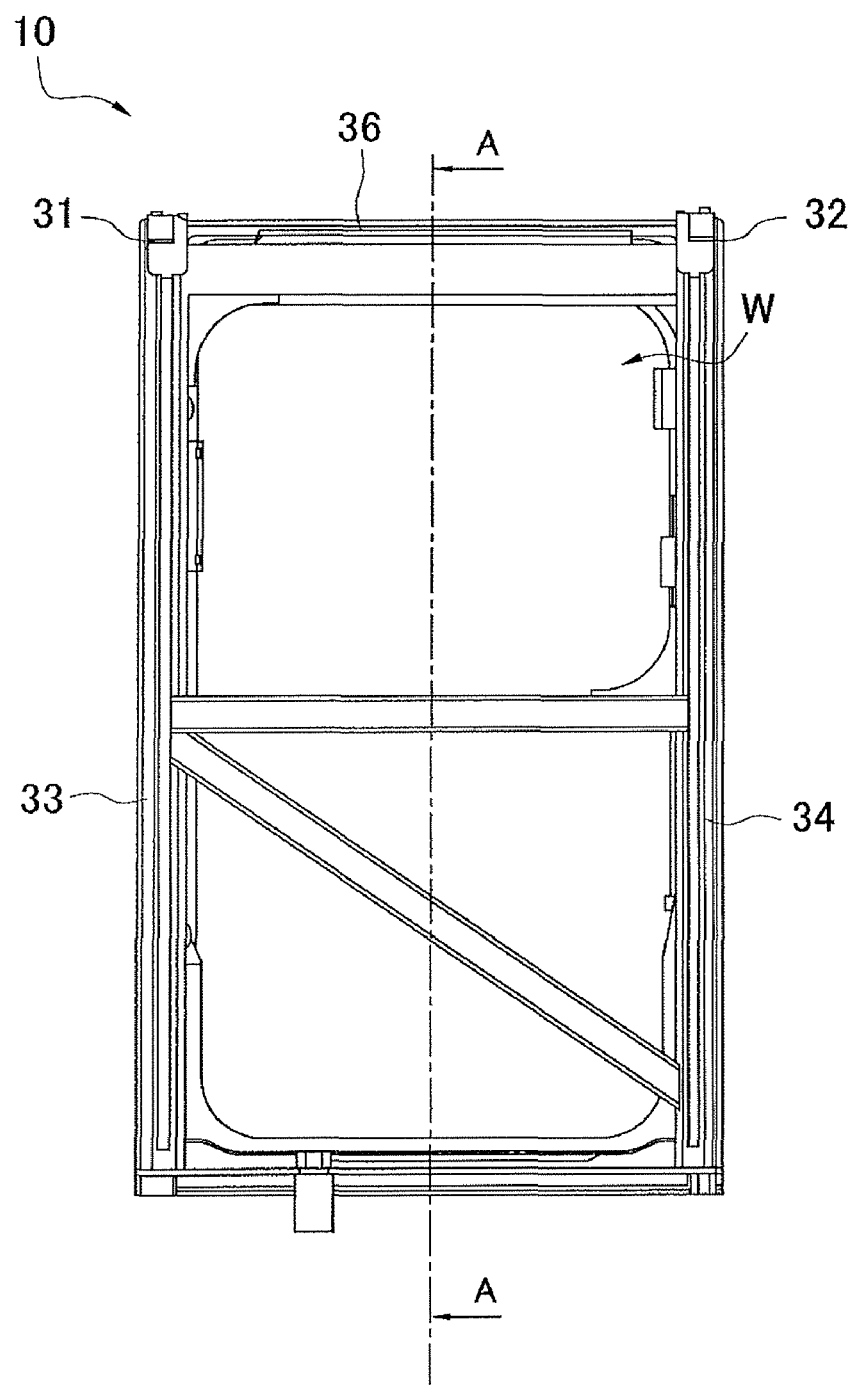
FIG. 3 is a rear view of the cab illustrated in FIG. 2.
Figure 4:
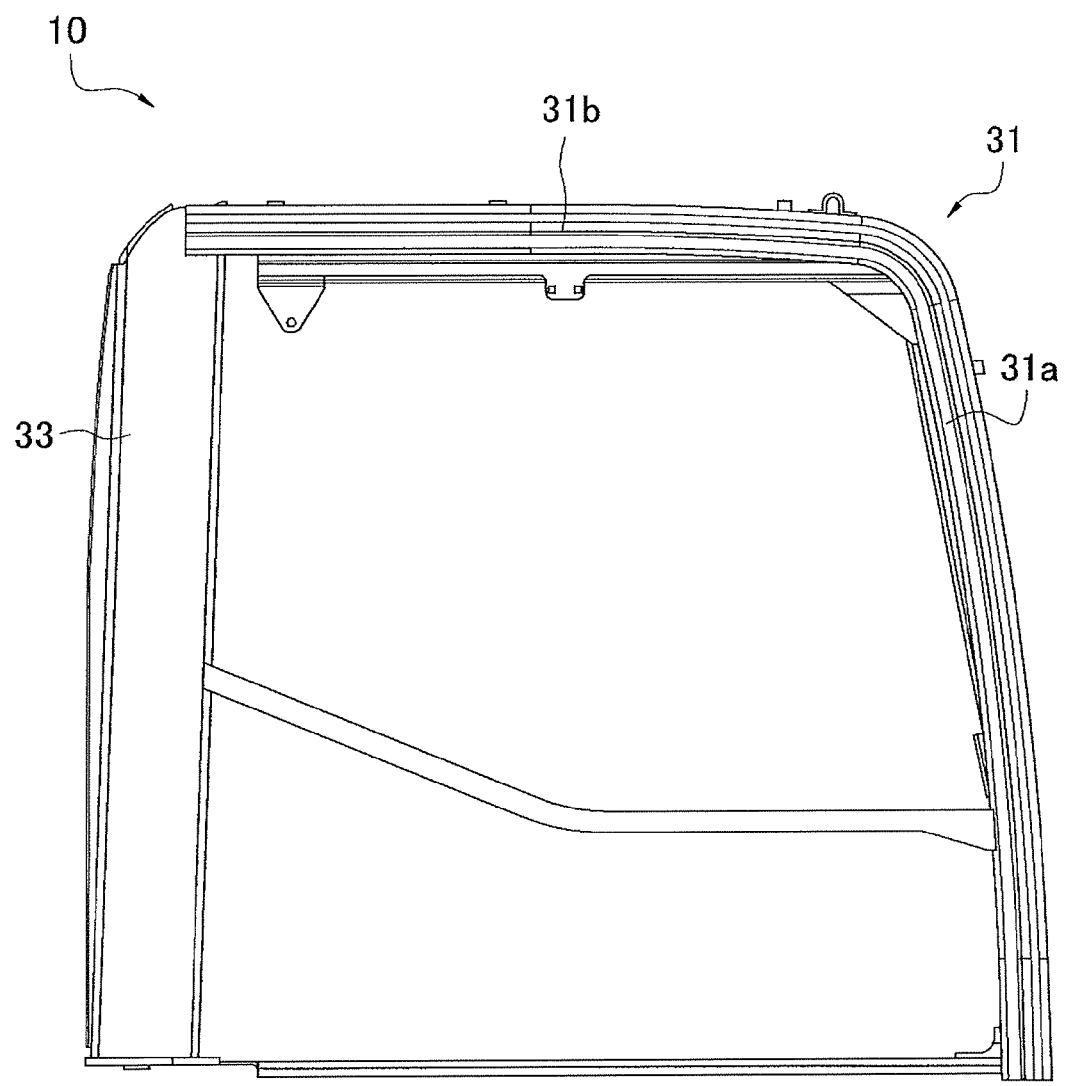
FIG. 4 is a cross-sectional view of the cab sectioned along Line A-A in FIG. 3.

As illustrated in FIGS. 2 to 4, the cab 10 of the present exemplary embodiment is formed by five pillar members 31 to 35, a transverse bar member 36, cover members 41, a rear window section W, and the like. It should be noted in the following description that only the left front pillar member 31 is explained as an example of the left and right front pillar members 31, 32, while only the left rear pillar member 33 is explained as an example of the left and right rear pillar members 33, 34 with reference to figures including FIGS. 7(a) and 8(a). However, the right front pillar member 32 is structured identical to the left front pillar member 31 lateral-symmetrically disposed thereto, while the right rear pillar member 34 is structured identical to the left rear pillar member 33 lateral-symmetrically disposed thereto.

The pillar members 31 to 35 are composed of the left front pillar member 31, the right front pillar member 32, the left rear pillar member 33, the right rear pillar member 34, and the left middle pillar member 35.

Figure 5:
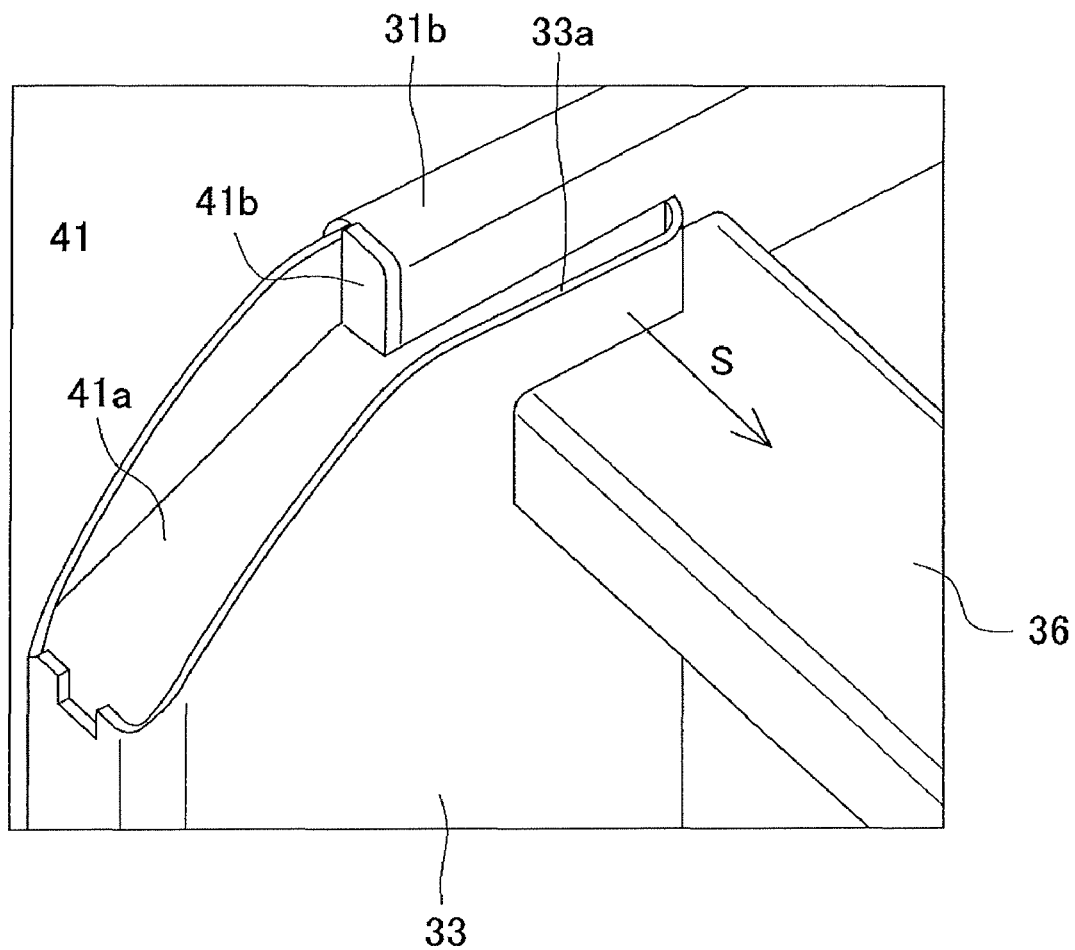
FIG. 5 is a perspective view of a joint structure of members in a rear part of the cab illustrated in FIGS. 2 to 4.
Figure 6:
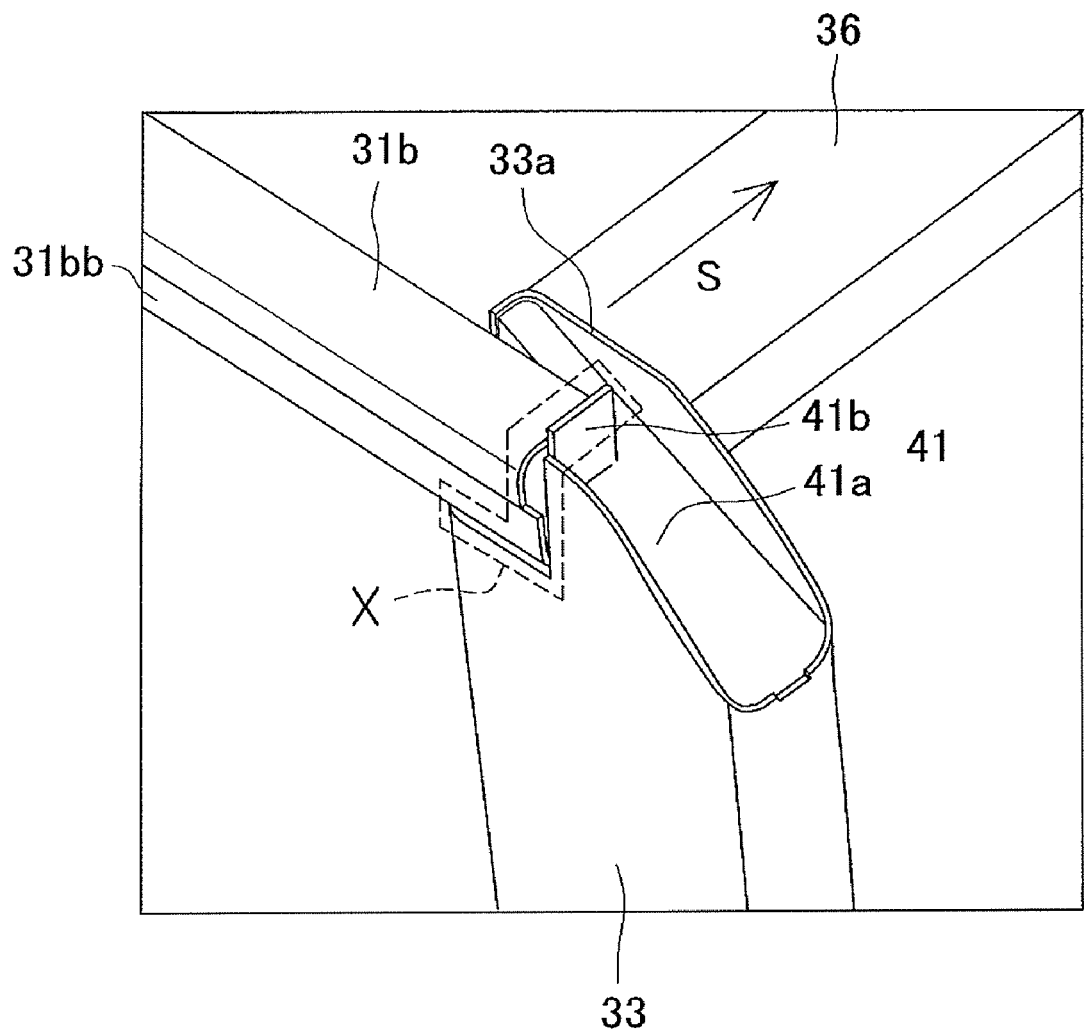
FIG. 6 is a perspective view of the joint structure of the members in the rear part of the cab illustrated in FIGS. 2 to 4.
Figure 7:
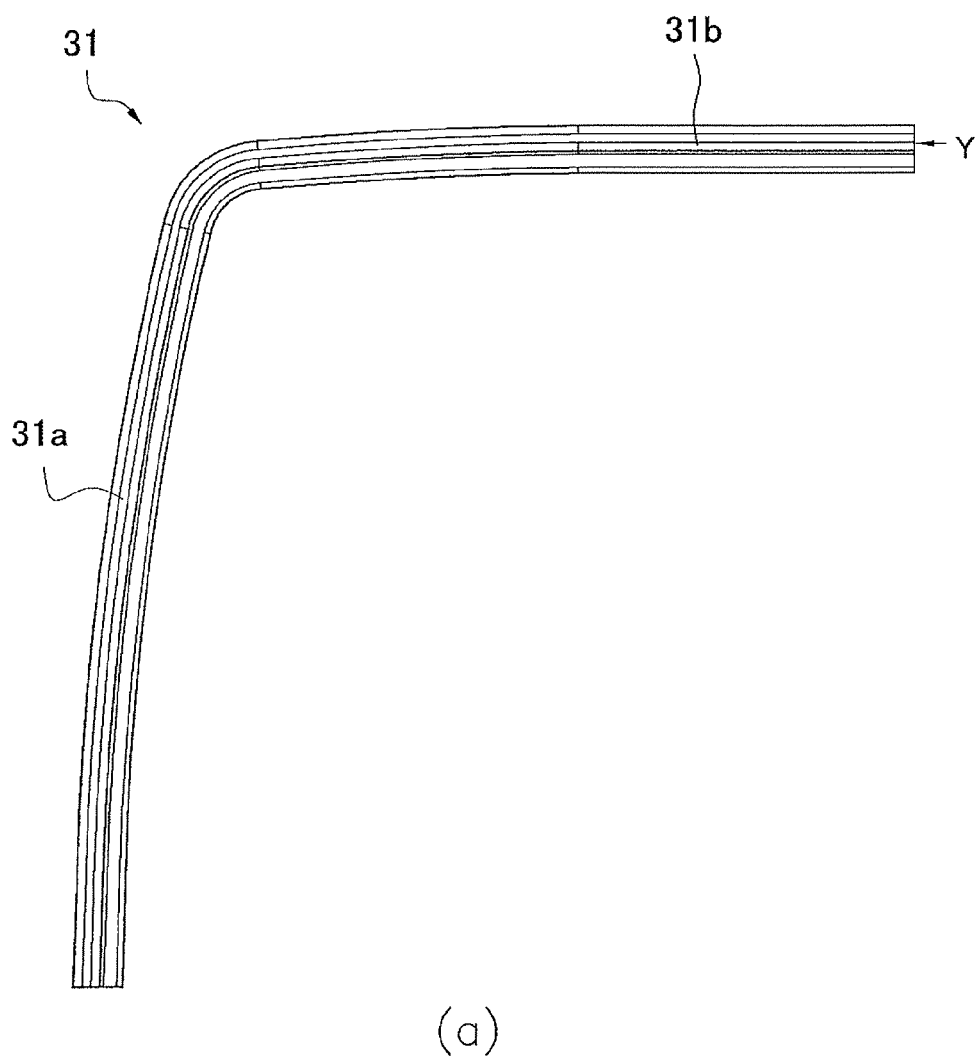
Figure 7:
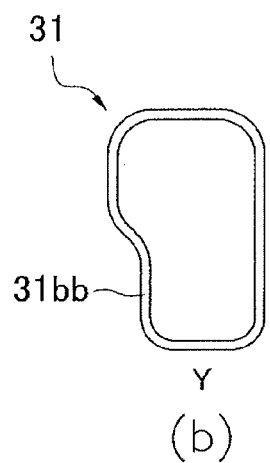
Figure 8:
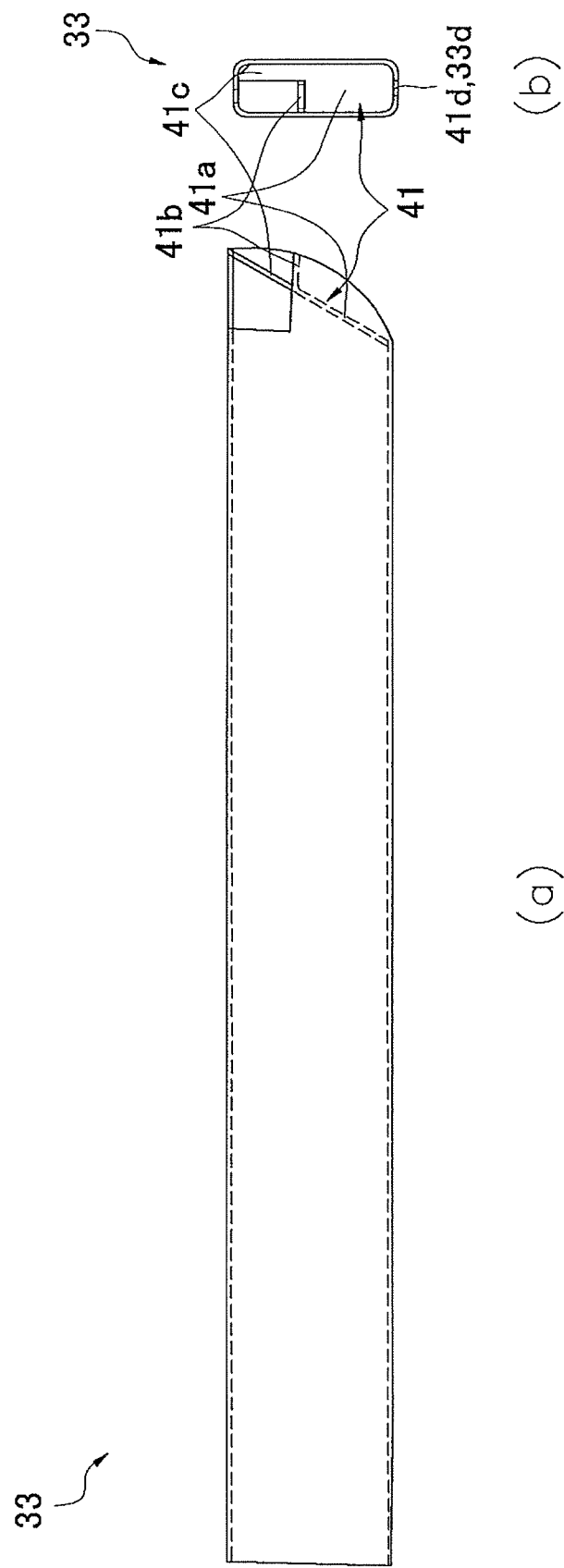
Figure 9:
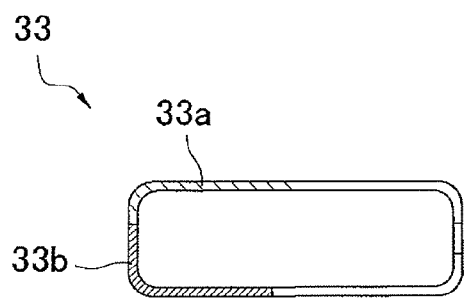
Figure 9:
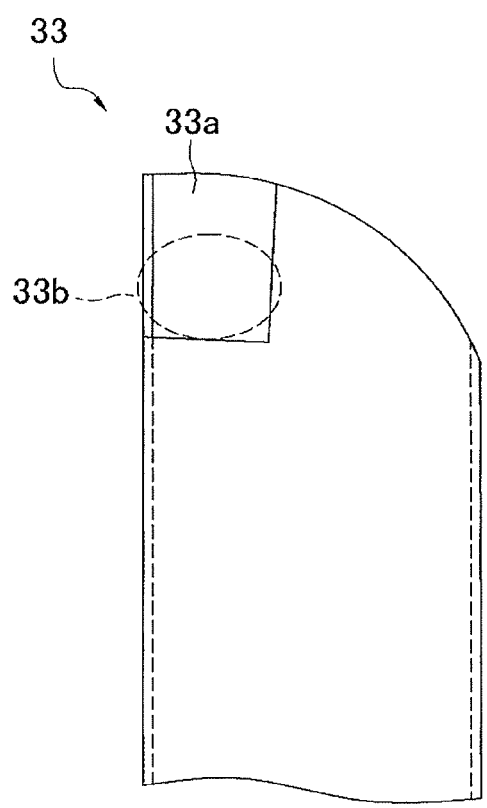

As illustrated in FIG. 2, the left front pillar member 31 and the right front pillar member 32 are disposed on the left and right front parts of the cab 10. The left and right front pillar members 31, 32 are used as pillars, so called "A-pillars". As illustrated in FIGS. 5 and 6, the left (right) front pillar member 31 (32) is welded and joined to the left (right) rear pillar member 33 (34) under the condition that the tip of a beam portion (i.e., a beam member) 31b (or the like) is disposed on a cutout portion 33b (or the like) formed at the upper end of the left (right) rear pillar member 33 (34) (see e.g., FIGS. 9(a) and 12). Further, the left (right) front pillar member 31 (32) has a deformed cross-section while including a hollow in the inside thereof, as illustrated in FIG. 7(b). As illustrated in FIG. 7(a), the left (right) front pillar member 31 (32) is bent in the roughly center part thereof. The left (right) front pillar member 31 thereby includes a pillar portion 31 (or the like) extended upright from a front part on the floor surface of the cab 10 and a beam portion 31b (or the like) forming a part of the ceiling surface of the cab 10. It should be noted that the deformed cross-section herein refers to, for instance, a cross-section formed in a roughly rectangular shape or a complex shape, excluding a cross-section of a cylindrical pipe.

As illustrated in FIG. 2, the left rear pillar member 33 and the right rear pillar member 34 are disposed in left and right rear parts of the cab 10. The left and right rear pillar members 33, 34 are used as pillars, so called "C-pillars". As illustrated in FIG. 8(b), the left (right) rear pillar member 33 (34) has a roughly rectangular deformed cross-section while including a hollow in the inside thereof. The left and right rear pillar members 33, 34 extend upright from a rear part of the floor surface of the cab 10 as roughly linear pillars. Further, upper end peripheral portions of the left and right rear pillar members 33, 34 are joined through the transverse bar member 36, as illustrated in FIGS. 2 and 3. Further, the cover members 41 to be described are welded and joined to the left and right rear pillar members 33, 34 for covering the end openings of the upper ends of the left and right rear pillar member 33, 34, as illustrated in FIGS. 8(a) and 8(b). Yet Further, as illustrated in FIGS. 9(a) and 9(b), the left rear pillar member 33 includes a protruding portion 33a and the cutout portion 33b on the upper end thereof where the beam portion 31b included in the left front pillar member 31 and the transverse bar member 36 to be described are welded and joined thereto. It should be noted that the right rear pillar member 34 also includes a protruding portion and a cutout portion similarly to the left rear pillar member 33.

Figure 12:
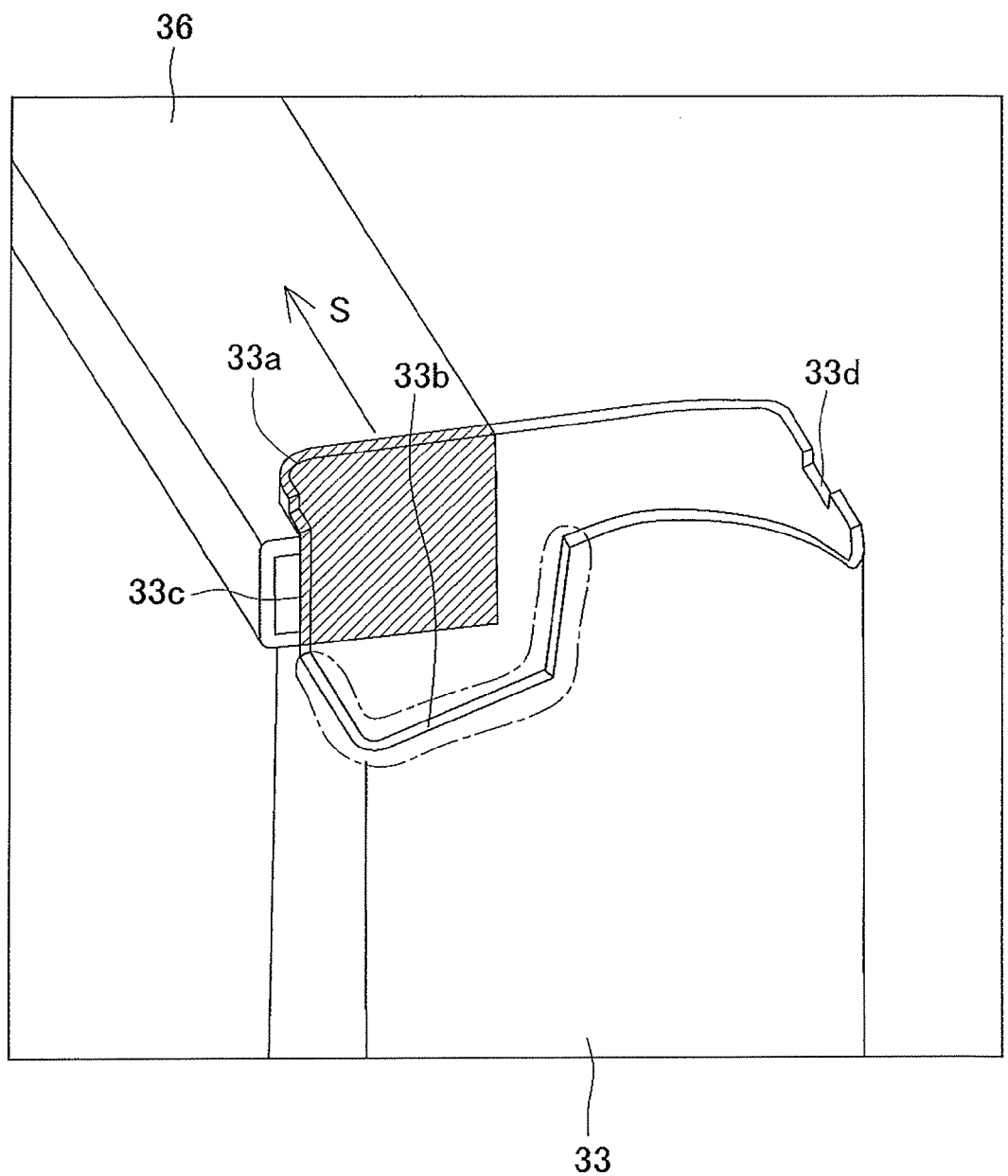
FIG. 12 is a perspective view of the structure of an upper end of a pillar member disposed in the rear part of the cab illustrated in FIGS. 2 to 4.

The protruding portion 33a is a portion remaining above the bottom of a cutout portion formed by cutting out the end of a pipe in a longitudinal direction (i.e., a vertical direction) of the pipe. As illustrated in FIGS. 5, 6 and 12, the protruding portion 33a (or the like) is formed on the upper end of the left (right) rear pillar member 33 (34) while facing an operator's room S of the cab 10. Even when load is applied from e.g., a lateral side of the cab 10, the protruding portion 33a (or the like) can support the beam portion 31b (or the like) of the left (right) front pillar member 31 (32). The cutout portion 33b (or the like) is formed by partially cutting the outer surface of the upper end of the left (right) rear pillar member 33 of the cab 10. The cutout portion 33b (or the like) is disposed adjacent to the aforementioned protruding portion 33a (or the like). The tip of the beam portion 31b (or the like) is welded and joined to the cutout portion 33b (or the like) while being disposed thereon.

Further, the beam portion 31b (or the like) of the left (right) front pillar member 31 (32) and the upper end of the left (right) rear pillar member 33 (34) are joined on a plane corresponding to a lateral surface of the cab 10 under the condition that a lower face 31bb of the beam portion 31b and an outside surface of the left rear pillar member 33 are joined to each other in a roughly flat manner, as illustrated in FIG. 6. Further, a window glass (not illustrated in the figure) is attached to the roughly flat outside surface.

As illustrated in FIG. 2, the left middle pillar member 35 is used as a pillar, so called a "B-pillar". The left middle pillar member 35 is extended upright between the floor surface and the beam portion of the left front pillar member 31.

Figure 10:
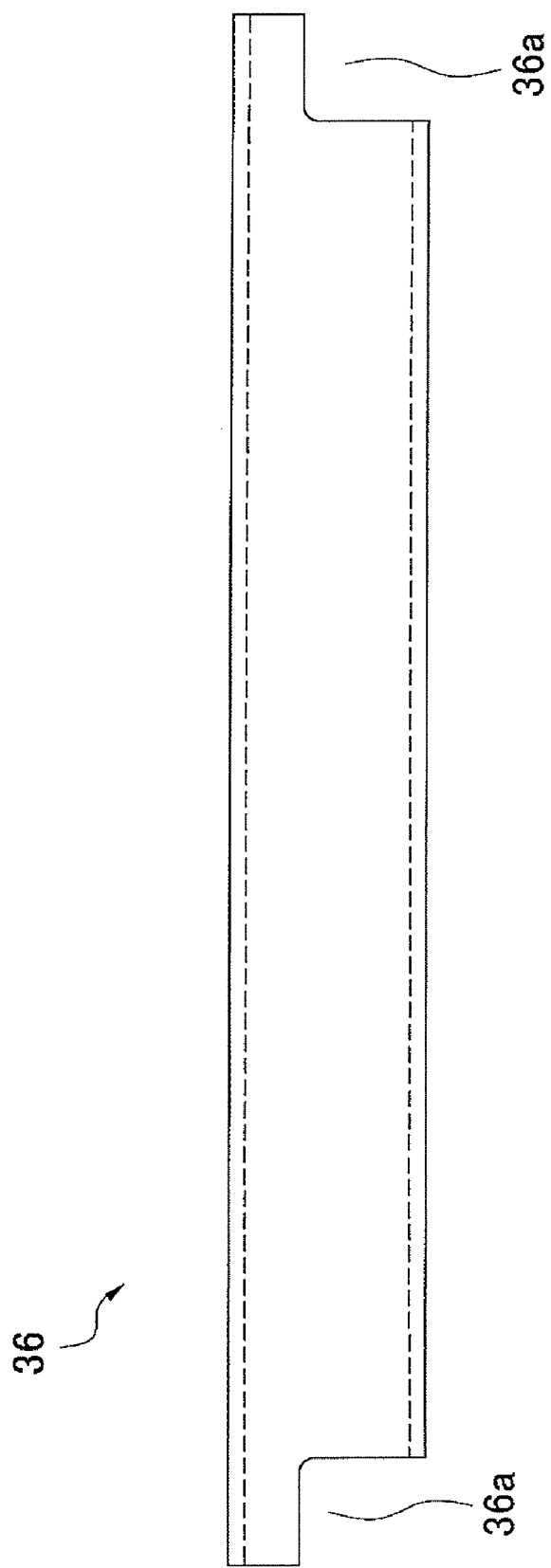
FIG. 10 is a front view of the entire structure of a transverse bar member forming a part of the cab illustrated in figures including FIG. 2.

The transverse bar member 36 is disposed as a hollow pipe material for supporting electric components (e.g., a speaker) disposed above a window frame of the rear window section W. As illustrated in figures including FIG. 2, the transverse bar member 36 is welded and joined to the upper end peripheral portions of the left and right rear pillar members 33, 34. Further, as illustrated in FIGS. 5 and 6, the transverse bar member 36 is welded and joined to the aforementioned joint sections (i.e., the joint section between the beam portion 31b of the left front pillar member 31 and the upper end of the left rear pillar member 33, and the joint section between the beam portion of the right front pillar member 32 and the upper end of the right rear pillar member 34) under the condition that the ends of the transverse bar member 36 are respectively abutted to the joint sections. Yet further, as illustrated in FIG. 10, the transverse bar member 36 includes cut portions 36a, 36a on the both ends thereof. As illustrated in FIG. 5, the structure makes it possible for the transverse bar member 36 to be abutted and fitted to the joint section between the upper end of the left (right) rear pillar member 33 (34) and the beam portion 31b (or the like). The transverse bar member 36 can thereby support the lateral surface of the beam portion 31b (or the like).

Figure 11:
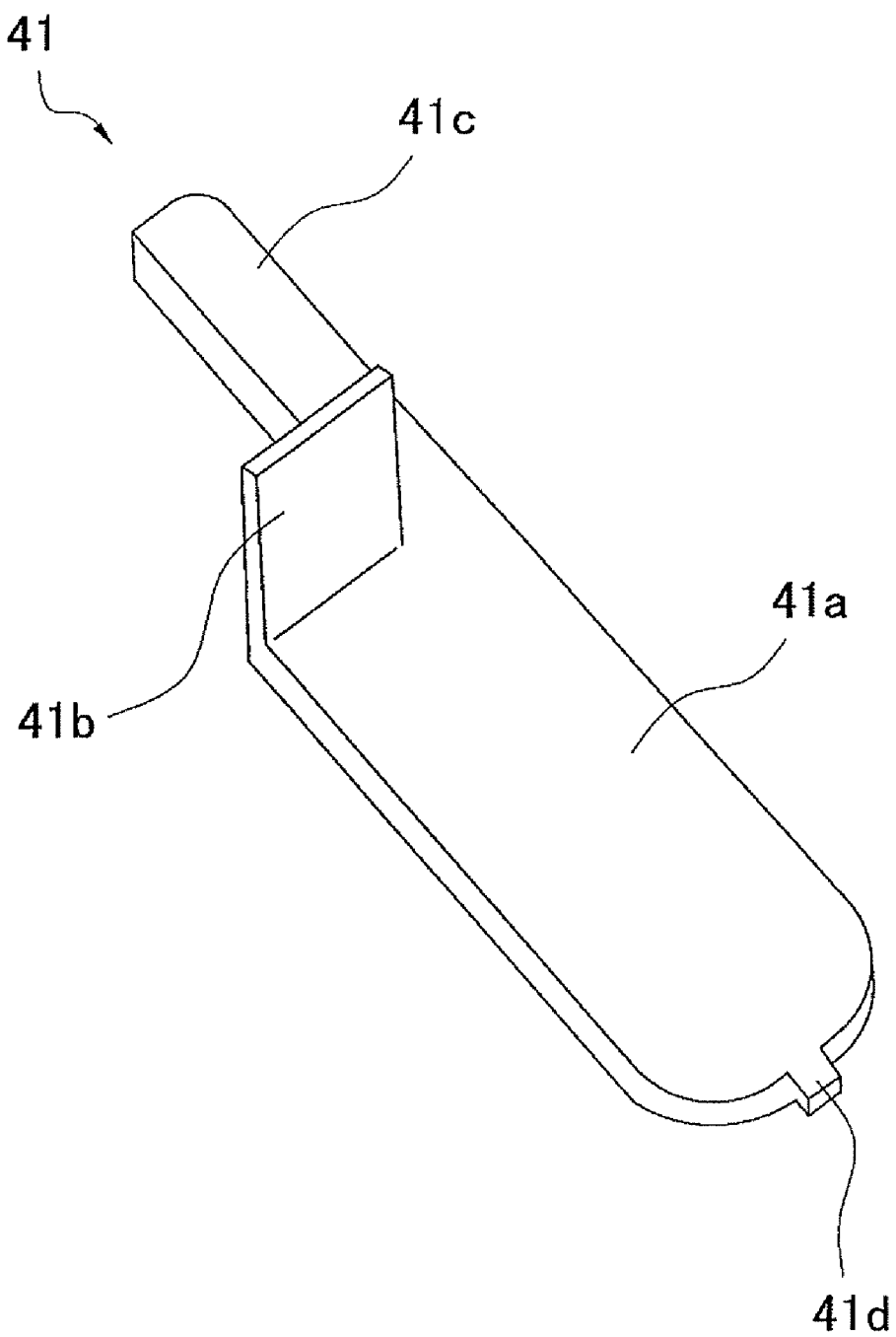
FIG. 11 is a perspective view of the structure of a cover member to be joined to the upper end of the right (left) rear pillar member illustrated in figures including FIG. 9(a).

As illustrated in FIGS. 5 and 6, each of the cover members 41 is a plate member to be welded and joined to the left (right) rear pillar member 33 (34) for covering the end opening of the upper end of the left (right) rear pillar member 33 (34). The cover member 41 is processed in a shape matched with the shape of the end opening of the left (right) rear pillar member 33 (34). Further, as illustrated in FIG. 11, the cover member 41 includes a flat portion 41a and a bent portion 41b. The flat portion 41a is processed in a shape for covering the end opening of the left (right) rear pillar member 33 (34) under the condition that the end of the beam portion 31b (or the like) is disposed on the upper end of the left (right) rear pillar member 33 (34). The bent portion 41b is bent with respect to the flat portion 41a for covering the end opening of the beam portion 31b (or the like) disposed on the upper end of the left (right) rear pillar member 33 (34). It is possible to enhance cross-sectional strength of the upper portion of the left (right) rear pillar member 33 (34) where the beam portion 31b (or the like) is welded and jointed by thus welding and joining the cover member 41 to the inside of the end opening of the upper end of the left (right) rear pillar member 33 (34). The cover member 41 further includes an abutment portion 41c and a positioning portion 41d. The abutment portion 41c is extended along the flat portion 41a while being disposed adjacent to the bent portion 41b. The abutment portion 41c is abutted to a lateral surface of the beam portion 31b under the condition that the beam portion 31b (or the like) is disposed on the upper end of the left (right) rear pillar member 33 (34). The positioning portion 41d is engaged with a recess 33d formed on the rear edge of the upper end of the left (right) rear pillar member 33 (34) for appropriately positioning the cover member 41.

Joint Structure of Members in Rear Part of Cab 10

According to the present exemplary embodiment, it is possible to realize a cab structure having high stiffness against loads applied from behind the cab 10 and from a lateral side of the cab 10 by welding and joining the aforementioned members as described below.

Specifically in the cab 10, as illustrated in FIGS. 5 and 6, the left (right) front pillar member 31 (32) is welded and joined to the left (right) rear pillar member 33 (34) under the condition that the beam portion 31b (or the like) of the left (right) front pillar member 31 (32) is disposed on the cutout portion 33b (or the like) formed on the upper end of the left (right) rear pillar member 33 (34). The beam portion 31b (or the like), disposed on the cutout portion 33b (or the like), is herein laterally supported from the operator's room S of the cab 10 by the protruding portion 33a (or the like) formed on the upper end of the left (right) rear pillar member 33 (34).

The beam portion 31b (or the like), disposed on the cutout portion 33b (or the like) of the left (right) rear pillar member 33 (34), is welded and joined to an area ranging from the joint section between the beam portion 31b (or the like) and the left (right) rear pillar member 33 (34) on the outside surface of the cab 10 to the contact section between the cover member 41 and the beam portion 31b (or the like). It is thus possible to faun the cab 10 having high stiffness against load from behind the cab 10 as well as load from a lateral side of the cab 10 by thus welding members including the cutout portion 33b (or the like) (see a welded section X in FIG. 6).

Further, the cover member 41 is welded and joined to the upper end of the left (right) rear pillar member 33 (34) while covering the end opening. It is possible to enhance cross-sectional strength of the left (right) rear pillar member 33 (34) by thus disposing the cover member 41 for covering the end opening of the upper end of the left (right) rear pillar member 33 (34) where the beam portion 31b (or the like) is welded and joined.

Yet further, according to the present exemplary embodiment, the transverse bar member 36 is abutted to the aforementioned joint sections from the operator's room S of the cab 10. Accordingly, it is possible to add the transverse bar member 36 as a member for laterally supporting the beam portion 31b (or the like) in addition to the protruding portion 33a (or the like) formed on the upper end of the left (right) rear pillar member 33 (34). Therefore, it is possible to further enhance stiffness against load applied from e.g., a lateral side of the cab 10.

Features of Cab 10 of Present Exemplary Embodiment (1) As illustrated in FIGS. 5 and 6, in the cab 10 of the present exemplary embodiment, the left (right) front pillar member 31 (32) is joined to the left (right) rear pillar member 33 (34) under the condition that the tip of the beam portion 31b (or the like) of the left (right) front pillar member 31 (32) is disposed on the upper end of the left (right) rear pillar member 33 (34). As illustrated in FIGS. 9(a), 9(b) and 12, the cutout portion 33b (or the like) and the protruding portion 33a (or the like) adjacent to the cutout portion 33b (or the like) are formed on the upper end of the left (right) rear pillar member 33 (34). As illustrated in FIGS. 5, 6 and 12, on the other hand, the beam portion 31b (or the like), disposed on the cutout portion 33b (or the like) of the left (right) rear pillar member 33 (34), is joined to the left (right) rear pillar member 33 (34) under the condition that a lateral portion thereof is abutted to the protruding portion 33a (or the like).

Further, in the cab 10 of the present exemplary embodiment, the edge of the abutment portion 41c of the cover member 41 is abutted to an abutment surface 33c disposed lateral to the beam portion 31b (or the like). Accordingly, the abutment portion 41c, together with the protruding portion 33a (or the like), resists against load applied from a lateral side of the cab 10.

The structure of supporting the lateral surface of the beam portion 31b (or the like) using the protruding portion 33a (or the like) makes the joint between the beam portion 31b (or the like) and the left (right) rear pillar member 33 (34) more rigid than the well-known type joint against load applied from e.g., a lateral side of the cab 10. As a result, it is possible to enhance stiffness of the cab 10 with a simple structure without using components such as coupling members.

(2) As illustrated in FIGS. 5, 6 and 12, in the cab 10 of the present exemplary embodiment, the protruding portion 33a (or the like), laterally supporting the beam portion 31b (or the like), is formed on a part of the upper end of the left (right) rear pillar member 33 (34) while facing the operator's room S of the cab 10.

Accordingly, the protruding portion 33a (or the like) reliably supports the beam portion 31b (or the like) from front when load is applied to a lateral side of the cab 10. Consequently, it is possible to enhance stiffness of the entire cab 10.

(3) As illustrated in FIGS. 5 and 6, the cab of the present exemplary embodiment further includes the transverse bar member 36 disposed under the condition that the ends thereof are abutted to the aforementioned joint sections (i.e., the joint section between the upper end of the left rear pillar member 33 and the beam portion 31b of the left front pillar member 31, and the joint section between the upper end of the right rear pillar member 34 and the beam portion of the right front pillar member 32) from the operator's room S of the cab 10.

Accordingly, the beam portion 31b (or the like) is laterally supported by the transverse bar member 36. It is consequently possible to enhance stiffness against load from a lateral surface of the cab 10.

(4) As illustrated in FIGS. 7(b) and 9(a), in the cab 10 of the present exemplary embodiment, each of the beam portion 31b (or the like) and the left (right) rear pillar member 33 (34) is formed by a hollow pipe material.

Accordingly, the entire cab 10 can be light weighted with a simple structure. Simultaneously, the cab 10 can be structured with higher strength. Further, as described above, the hollow pipe materials are used for the left and right rear pillar members 33, 34 respectively having end opening peripheral portions required to be processed. Processing properties of the left and right rear pillar members 33, 34 are thereby enhanced. Consequently, the cutout portions 33b, etc. can be efficiently formed in desired shapes.

(5) As illustrated in FIGS. 5 and 6, the cab 10 of the present exemplary embodiment further includes the cover members 41 to be attached to the left and right rear pillar members 33, 34 formed by the pipe materials for covering the end openings of the left and right real pillar members 33, 34.

The structure can enhance cross-sectional strength of the left and right rear pillar members 33, 34 having the covered end openings. Consequently, it is possible to enhance stiffness of the entire cab 10 against loads applied to the lateral and rear sides of the cab 10.

(6) As illustrated in figures including FIGS. 6 and 11, in the cab 10 of the present exemplary embodiment, the bent portion 41b, formed by partially bending the cover member 41, is joined to the beam portion 31b (or the like) for covering the end opening thereof.

Installation of the cover members 41 can thus enhance not only cross-sectional strength of the left and right rear pillar members 33, 34 but also cross-sectional strength of the beam portions 31b, etc. to be respectively joined to the left and right rear pillar members 33, 34. As a result, it is possible to further enhance stiffness of the cab 10.

(7) As illustrated in figures including FIG. 6, in the cab 10 of the present exemplary embodiment, a roughly flat surface is formed by the lower face 31bb (or the like) and the lateral surface of the left (right) rear pillar member 33 (34) at the joint section between the left (right) rear pillar member 33 (34) and the beam portion 31b (or the like) corresponding to a lateral surface of the cab 10.

Accordingly, the window glass can be easily attached to the roughly flat surface.

Other Exemplary Embodiments

One of the exemplary embodiments of the present invention has been explained above. However, the present invention is not limited to the aforementioned exemplary embodiment. A variety of changes can be made for the aforementioned exemplary embodiment without departing the scope of the present invention.

(A) The aforementioned exemplary embodiment has exemplified the case that the beam portion 31b of the left front pillar member 31, which is joined to the left rear pillar member 33 while being disposed on a part of the cutout portion 33b formed on the upper end of the left rear pillar member 33, has width smaller than that of the left rear pillar member 33 in the transverse direction of the cab 10. However, the present invention is not limited to this.

Figure 13:
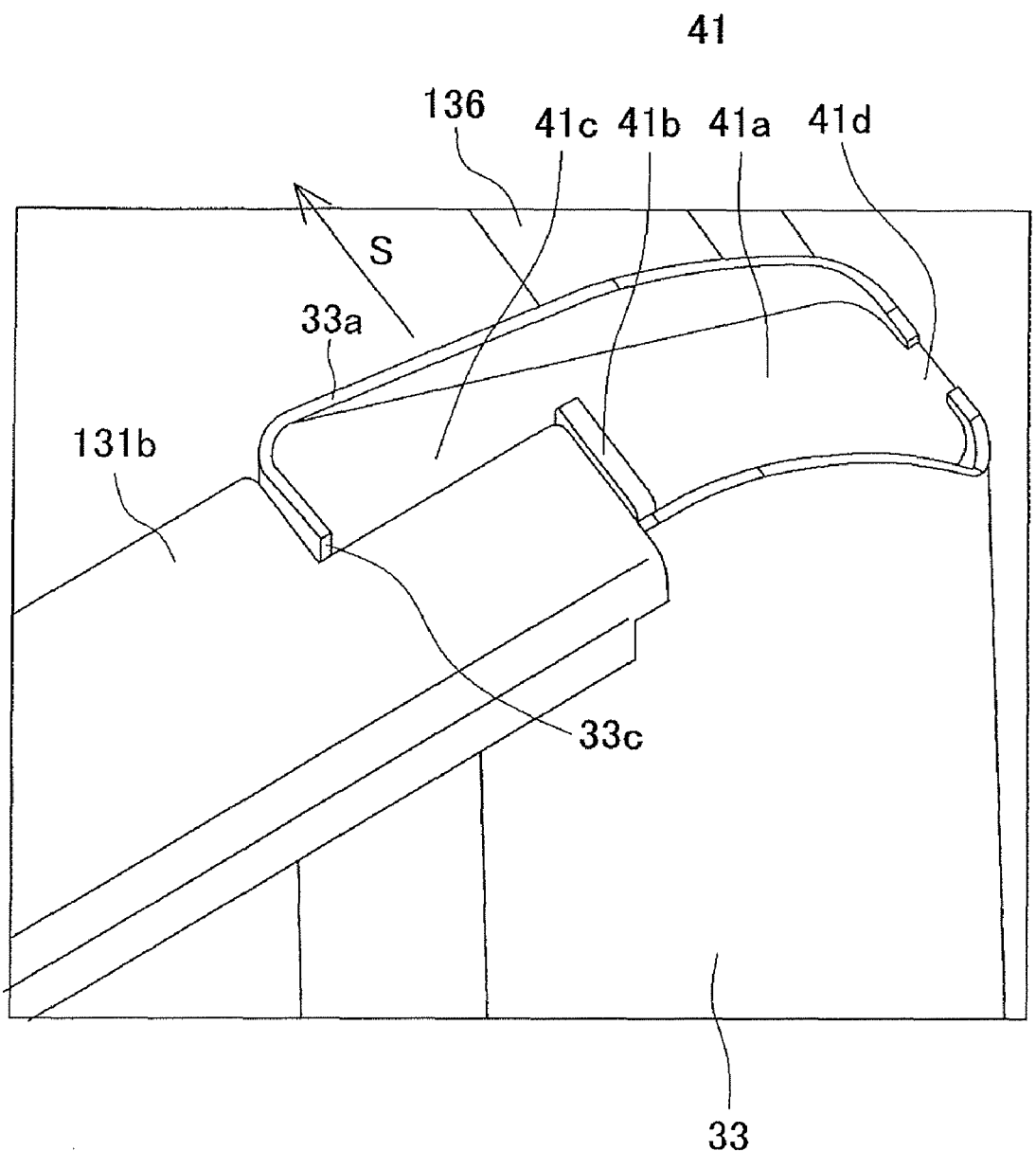
FIG. 13 is an enlarged perspective view of the structure of a rear part of a cab according to another exemplary embodiment of the present invention.

As illustrated in FIG. 13, for instance, the cab may include a beam portion 131b having width larger than that of the left rear pillar member 33 at the joint section thereof with the left rear pillar member 33. In this case, the beam portion 131b includes a cut in the tip thereof. The beam portion 131b is thereby joined to the left rear pillar member 33 under the condition that the tip thereof is disposed on the cutout portion 33b of the left rear pillar member 33.

Similarly to the aforementioned exemplary embodiment, the left rear pillar member herein includes a protruding portion disposed adjacent to the cutout portion on the upper end thereof. The beam portion, disposed on portions of the left rear pillar member (e.g., the cutout portion), is joined to the left rear pillar member under the condition that lateral surfaces thereof are partially abutted to portions of the left rear pillar member (e.g., the protruding portion).

Further, the edge of the abutment portion 41c of the cover member 41 is abutted to the abutment surface 33c disposed lateral to portions including the beam portion 131b. The abutment portion 41c, together with portions including the protruding portion 33a, supports load applied from a lateral side of the cab 10.

Similarly to the aforementioned exemplary embodiment, it is possible to form a cab with high stiffness even against load applied from a lateral side even when the width size of the beam member is changed with respect to the pillar member.

(B) The aforementioned exemplary embodiment has exemplified the case that the transverse bar member 36 is disposed under the condition that one of the tips thereof is abutted to the joint section between the upper end of the left rear pillar member 33 and the beam portion 31b of the left front pillar member 31 from the operator's room S of the cab 10. However, the present invention is not limited to this.

As illustrated in FIG. 13, for instance, a transverse bar member 136 may be displaced from the aforementioned joint section. Similarly to the aforementioned exemplary embodiment, the beam member 131b can be herein laterally supported by the protruding portion 33a formed on the upper end of the left rear pillar member 33. Therefore, it is possible to form a cab with high stiffness even against load applied from a lateral side of the cab.

It should be noted that the structure of the aforementioned exemplary embodiment is preferably adopted in terms of the advantage that the beam member can be further rigidly supported by abutting the transverse bar member thereto when load is laterally applied to the cab.

(C) The aforementioned exemplary embodiment has exemplified the case that the present invention is applied to the joint section where the pillar member 31b of the left front pillar member 31 intersects the left rear pillar member 33 and the joint section where the pillar member of the right front pillar member 32 intersects the right rear pillar member 34. However, the present invention is not limited to this.

Excluding the aforementioned joint sections, the present invention can be applied to, for instance, a joint section between the upper end of the left middle pillar member and the beam member of the left front pillar member.

In this case, advantageous effects similarly to the above can be achieved by the structure that the beam member is supported by a protruding portion formed on the upper end of the left middle pillar member.

(D) The aforementioned exemplary embodiment has exemplified the case that the left (right) front pillar member 31 (32) is bent in the roughly center part thereof and accordingly includes the pillar portion 31a (or the like) extended upright from the front part of the floor surface of the cab 10 and the beam portion 31b (or the like) forming a part of the ceiling surface. However, the present invention is not limited to this.

For example, the pillar portion and the beam portion may be formed as separate individual members.

(E) The aforementioned exemplary embodiment has exemplified the case that the cutout portion 33b, formed on the upper end of the left rear pillar member 33, has a cutout shape formed by cutting out the left front portion of the left rear pillar member 33 in a plan view. However, the present invention is not limited to this.

In the present invention, a variety of shapes can be adopted for the cutout portion as long as the protruding portion facing the operator's room S is reliably formed.

(F) In the aforementioned exemplary embodiment, the hydraulic excavator 1 has been explained as an example of the construction machine provided with the cab having the structure of the present invention. However, the present invention is not limited to this.

For example, the cab of any of the illustrated embodiments is applicable to the cabs mounted on the construction machines of the other types such as the wheel loaders.

The cab for a construction machine according to any of the illustrated embodiments achieves an advantageous effect of obtaining a cab structure with sufficient strength for avoiding increase in the number of components. The cab is thereby widely applicable to the cabs for the construction machines of other types in addition to the hydraulic excavators.

The invention claimed is:

1. A cab for a construction machine comprising:
   a pillar member disposed generally along a vertical direction, the pillar member including
      a cutout portion formed on an upper end thereof, and
      a protruding portion formed on the upper end on an inner side of the cutout portion with respect to a widthwise direction of the cab; and
   a beam member disposed generally along a direction perpendicular to the vertical direction, the beam member being joined to the pillar member with the beam member partially overlapping the cutout portion on the upper end of the pillar member in a plan view, and a lateral surface of the beam member abutting against the protruding portion.

2. The cab for a construction machine according to claim 1, further comprising
   a transverse bar member abutting against a lateral surface of the pillar member from the inner side of the cab.

3. The cab for a construction machine according to claim 1, further comprising
   an additional pillar member disposed generally along the vertical direction on an opposite side from the pillar member with respect to the widthwise direction of the cab, or an additional beam member disposed generally along the direction perpendicular to the vertical direction on an opposite side from the beam member with respect to the widthwise direction,
   a transverse bar member connecting at least one of between the pillar member and the additional pillar member and between the beam member and the additional beam member, the transverse bar member abutting against a joint section between the pillar member and the beam member or a joint section between the additional pillar member and the additional beam member from the inner side of the cab.

4. The cab for a construction machine according to claim 1, wherein
   the pillar member and the beam member form a flat surface at a part of a joint section therebetween facing an outer side of the cab.

5. The cab for a construction machine according to claim 1, wherein
   the pillar member is a left rear pillar member disposed on a left rear part of the cab, and
   the beam member is joined to the left rear pillar member.

6. The cab for a construction machine according to claim 1, wherein
   each of the pillar member and the beam member is formed by a pipe material.

7. The cab for a construction machine according to claim 6, further comprising
a cover member inserted into a hollow of the pipe material at the upper end of the pillar member.

8. The cab for a construction machine according to claim 7, wherein
the cover member abuts against the lateral surface of the beam member together with the protruding portion.

9. The cab for a construction machine according to claim 7, wherein
the cover member includes a bent portion joined to an end opening of the beam member disposed on the upper end of the pillar member.

* * * * *